(12) United States Patent  
Park et al.

(10) Patent No.: US 10,087,648 B2
(45) Date of Patent: Oct. 2, 2018

(54) PIPE COVER

(71) Applicant: BIGARIM CO., LTD., Chungcheongnam-do (KR)

(72) Inventors: Kyung-Sik Park, Chungcheongnam-do (KR); Yang-Shin Lim, Chungcheongnam-do (KR); So-Min Park, Chungcheongnam-do (KR); Min-Jun Park, Chungcheongnam-do (KR); Ee-Eeun Park, Chungcheongnam-do (KR)

(73) Assignee: BIGARIM CO., LTD., Nonsan-si, Chungcheongnam-do (KR)

( * ) Notice: Subject to any disclaimer, the term of this patent is extended or adjusted under 35 U.S.C. 154(b) by 232 days.

(21) Appl. No.: 14/852,869

(22) Filed: Sep. 14, 2015

(65) Prior Publication Data

US 2016/0102472 A1    Apr. 14, 2016

(30) Foreign Application Priority Data

Sep. 16, 2014  (KR) .................. 10-2014-0122835

(51) Int. Cl.
*E04H 12/22* (2006.01)
*F16B 5/00* (2006.01)
*F16B 7/22* (2006.01)

(52) U.S. Cl.
CPC ....... *E04H 12/2292* (2013.01); *F16B 5/0056* (2013.01); *F16B 7/22* (2013.01)

(58) Field of Classification Search
CPC ...... E04H 12/2292; F16B 7/22; F16B 5/0056; E04C 3/30; E04C 2003/0413; E04C 2/292; E04C 2003/0417; E04C 2003/0447; E04C 2/20; E04C 2/34; E04C 2/40; E04C 2/528; E04C 3/07; E04C 3/12; E04C 3/127; E04C 3/28; E04C 3/36; E04F 11/1842; E04F 2201/0115; E04F 13/0733; E04F 13/0736; E04F 2201/041; E04F 13/0876; E04F 15/02038; E04F 2201/0146; E04F 2201/0153; E04F 2201/05; E04F 13/00; E04F 19/00; E04F 2201/03; E04F 2201/0523; E04F 2001/2451; E04F 2001/5893; E04F 2002/0213; E04F 13/0889; E04F 13/0894; E04B 1/18; E04B 2001/2451; E04B 2001/5893; E04B 2002/0213; E04B 2/18; E04B 7/22
USPC ......... 52/831, 834, 843, 844, 650.1, 651.01, 52/651.07, 588.1, 592.1, 309.9, 845, 580, (Continued)

(56) References Cited

U.S. PATENT DOCUMENTS 5,956,920 A * 9/1999 Davis .................. E04C 3/30
                                                    52/236.1
6,167,672 B1 * 1/2001 Okitomo .............. E02D 5/60
                                                     405/216

(Continued)

FOREIGN PATENT DOCUMENTS

KR    10-0751285 B1    8/2007
KR    10-0798297 B1    1/2008

*Primary Examiner* — Coris Fung
*Assistant Examiner* — Julius Fitzhugh
(74) *Attorney, Agent, or Firm* — Rabin & Berdo, P.C.

(57) ABSTRACT

Disclosed is a pipe cover. The pipe cover has coupling units provided at both ends thereof and is disposed so as to surround a post structure by combining the coupling unit of one unit cover with the coupling unit of another unit cover.

6 Claims, 21 Drawing Sheets

(58) Field of Classification Search
USPC ..... 52/581, 589.1, 591.1, 747.1, 794.1, 835, 52/100, 254, 792.1, 169.14, 170
See application file for complete search history.

(56) References Cited

U.S. PATENT DOCUMENTS

2001/0022056 A1* 9/2001 Gifford ............... E04F 13/0736
52/311.1
2010/0319197 A1* 12/2010 Kan .......................... E04C 2/40
29/897.32

* cited by examiner (b)

PIPE COVER

BACKGROUND OF THE INVENTION

Field of the Invention

The present invention relates to a pipe cover in which hanging projections and hanging parts of respective unit covers are assembled so as to be rapidly adhered to a post structure.

Description of the Related Art

In general, advertisement leaflets are adhered to post structures, such as lamp posts, electric poles, signal lamp posts, road signs and the like installed in a city, thus spoiling the appearance of the city. Therefore, covers installed on the outer surfaces of conventional post structures are proposed.

Korean Patent Registration No. 10-0798297 entitled "Protection Guard for Impact Absorption for Use in Post Structure Having Advertisement Function (hereinafter, referred to as "prior art 1")" has problems, as below.

In prior art 1, since a protection guard is assembled so as to be rotatable by a shaft hole and a hinge shaft and such assembly is carried out by a bolt hole and a bolt nut, assembly is very complicated and requires a long time.

Further, in prior art 1, since an element to fix the protection guard to a post structure is not provided, the projection guard may be installed only at the lower part of the post structure and installation of the projection guard at the middle part of the post structure is difficult.

Korean Patent Registration No. 10-0751285 entitled "Pole of Streetlight Having Double Walls (hereinafter, referred to as "prior art 2")" has problems, as below.

In prior art 2, an external post member having a pipe shape is inserted into a post structure from the top and then fixed and, thus, assembly is very inconvenient and adhesion of the external post member to the post structure is very low.

Further, in prior art 2, since only a part of the external post member is fixed to the post structure by an insertion ring, adhesion of the external post member to the post structure is very low due to a space formed between the post structure and the external port member.

Moreover, in prior art 2, since there is no separate fixing unit to fix the external post member to the post structure, the external post member may be installed only at the lower part of the post structure and installation of the external post member at the middle part of the post structure is difficult, thus being incapable of satisfying consumer expectations.

SUMMARY OF THE INVENTION

Therefore, the present invention has been made in view of the above problems, and it is an object of the present invention to provide a pipe cover in which hanging projections and hanging parts of respective unit covers are pulled and assembled so as to be rapidly adhered to a post structure, the unit covers are easily and rapidly combined with each other by coupling the hanging projections and the hanging parts with each other using elasticity of the unit covers, and no separate part to fix the unit covers to the post structure is required by primarily assembling the hanging projection formed integrally with one unit cover with the hanging part formed on another unit cover.

In accordance with the present invention, the above and other objects can be accomplished by the provision of a pipe cover including a plurality of unit covers having coupling units provided at both ends thereof and disposed so as to surround a post structure by combining the coupling unit of one unit cover with the coupling unit of another unit cover, wherein each unit cover includes a plurality of panel parts, each panel part including an outer part forming the outer surface of the panel part and bending parts bending from both ends of the outer part towards the post structure, and connection parts configured to connect the bending parts of the panel parts disposed adjacent to each other.

The panel part may be disposed at one end of the unit cover and the connection part is disposed at the other end of the unit cover, the coupling unit provided on one end of the unit cover may be a hanging projection formed at the end of the bending part disposed at the outer position of the panel part, the coupling unit provided on the other end of the unit cover may be a coupling part formed at the end of the connection part, one end of the coupling part may be disposed close to the post structure and a hanging part to hang the hanging projection may be formed at the other end of the coupling part.

The hanging projection may protrude towards the inner surface of the panel part and the hanging part may be disposed on the inner surface of the hanging projection.

The hanging part may include a slope part formed at the end of the coupling part and sloped so as to be closer to the connection part in a direction from the end to the center thereof and a receipt groove located under the slope part so that the hanging projection is received in the receipt groove, and the hanging projection may slide along the slope part and be received in the receipt groove.

The hanging part may include a curved part formed at one end of the coupling part and bent in a direction opposite the position of the connection part so as to contact the inner surface of the bending part provided with the fixing protrusion and a receipt groove located under the curved part so that the hanging projection is received in the receipt groove, and the hanging projection may slide along the curved surface of the curved part and be received in the receipt groove.

Prominences and depressions may be formed on the panel part so as to minimize adhesion parts of attachments adhered to the post structure.

An adhesive unit may be adhered to the outer surface of the post structure and the ends of the bending parts may contact the adhesive unit.

An end cap may be installed at the upper ends or lower ends of the unit covers so as to close spaces between the post structure and the unit covers, when the unit covers are disposed so as to surround the post structure.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference will now be made in detail to the preferred embodiments of the present invention, examples of which are illustrated in the accompanying drawings. In addition, terms used in the following description are defined taking into consideration the functions obtained in accordance with the present invention. The definitions of these terms should be determined based on the whole content of this specification because they may be changed in accordance with the option of a user or a usual practice.

Therefore, although embodiments of the invention have been shown and described, it would be appreciated by those skilled in the art that changes may be made in these embodiments without departing from the principles and spirit of the invention, the scope of which is defined in the claims and their equivalents.

Pipe Cover in Accordance with Embodiment 1

FIGS. 1 to 5 illustrate a pipe cover in accordance with embodiment 1.

A post structure 100 on which the pipe cover in accordance with the present invention is installed may be one of various post structures 100 which a pipe cover may surround so as to improve beauty of the city or to decorate the city, such as lamp posts, electric poles, fence posts, signal lamp posts, road signs, sunshade posts and the like.

Figure 1:
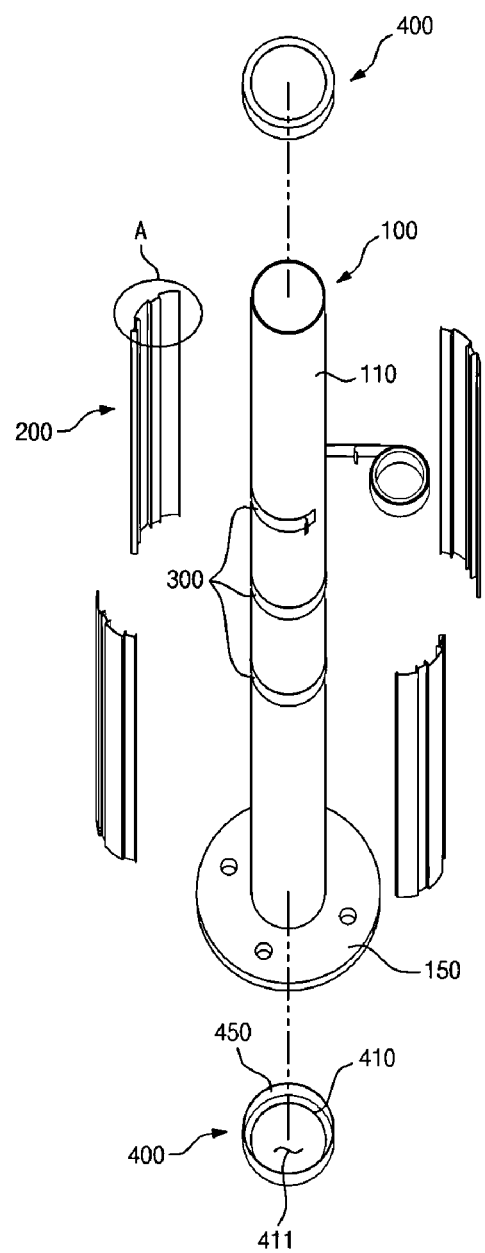
FIG. 1 is an exploded perspective view of a pipe cover in accordance with embodiment 1 of the present invention.

As exemplarily shown in FIG. 1, the post structure 100 proposed in embodiment 1 includes a post main body 110 disposed in the vertical direction with respect to the ground and a base plate 150 having a plate shape and extending outwards along the circumference of the lower end of the post main body 110. Although this embodiment describes the base plate 150 as having a circular plate shape, the base plate 150 may have various shapes including a rectangular plate shape according to embodiments. The base plate 150 is installed on the ground. Further, although this embodiment describes the post main body 110 as having a circular pipe shape, the post main body 110 may have a rectangular pipe shape according to embodiments.

The pipe cover provided to surround the post main body 110 of the post structure 100 includes a plurality of unit covers 200, and the respective unit covers 200 are combined so as to surround the outer surface of the post main body 110 having a circular pipe shape.

Figure 2:
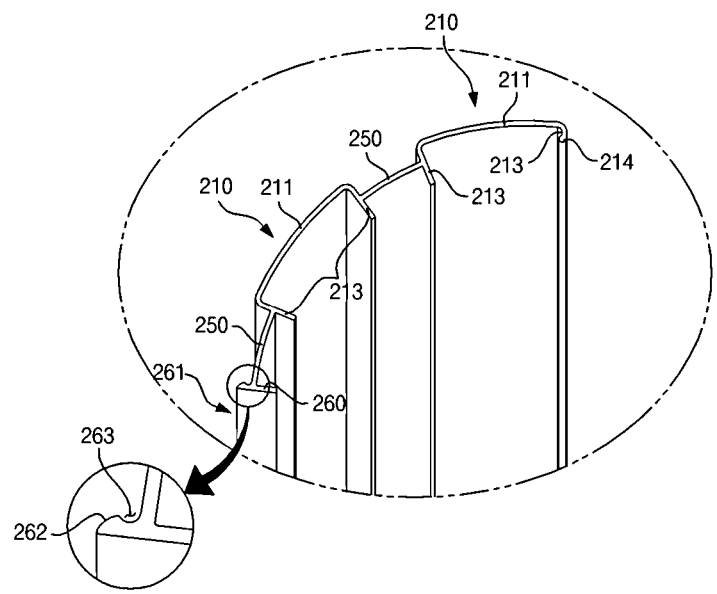
FIG. 2 is an enlarged perspective view of a part of a unit cover of FIG. 1.

The unit cover 200, as exemplarily shown in Fig.2, may include a plurality of panel parts 210 and connection parts 250 connecting the panel parts 210.

The panel part 210 includes an outer part 211 forming the outer surface of the panel part 210 and bending parts bending from both ends of the outer part 211 towards the post structure 100. In this embodiment, since the post main body 100 has a circular pipe shape, the outer part 211 forming the outer surface of the panel part 210 does not have a straight shape but has an arc shape and the bending parts 213 bending from both ends of the panel part 211 do not bend perpendicularly from the outer part 211 but bend obliquely in directions of being closer to each other.

Figure 4:
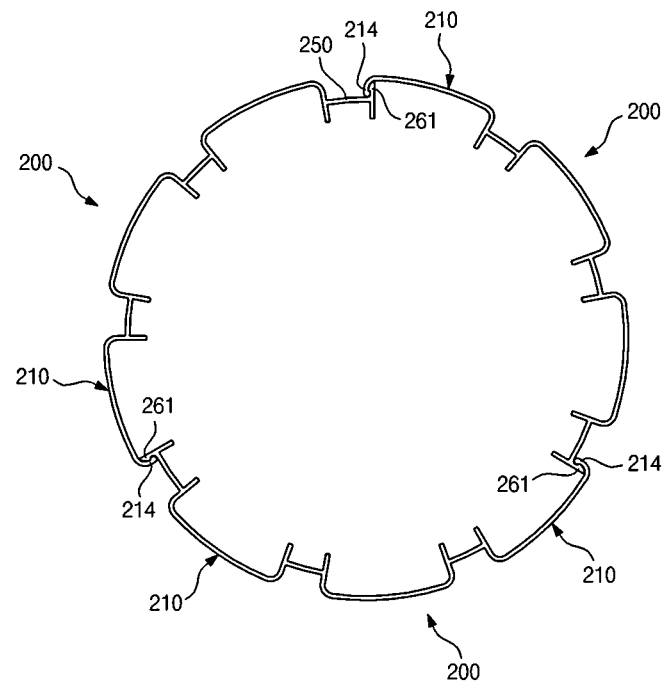
FIG. 4 is a plan view illustrating a state in which three unit covers of FIG. 1 are combined.

Although this embodiment describes one unit cover 200 as including two above-described panel parts 210, one unit cover 200 may include three panel parts 210, as exemplarily shown in FIG. 4, according to embodiments, and the number of the panel parts 210 may be varied.

The connection part 250 connects the bending parts 213 of the respective panel parts 210 which are disposed adjacent to each other. In this embodiment, the connection part 250 has an arc shape and is provided to connect the central regions of the bending parts 213.

In the unit cover 200 including the panel parts 210 and the connection parts 250, the panel part 210 is disposed at one end of the unit cover 200 and the connection part 250 is disposed at the other end of the unit cover 200.

Among the bending parts 213 of the panel part 210 disposed at one end of the unit cover 200, the bending part 213 disposed at the outer position may have a shorter length than the other bending part 213. A hanging projection 214 is formed at the end of the bending part 213 having a short length provided at the outer position.

Such a hanging projection 214 may protrude towards the inner surface of the panel part 210.

In this embodiment, the hanging projection 214 formed at the end of the bending part 213 connects the outer surface and the inner surface of the bending part 213, is formed in an arc shape which is convex in the outward direction, and protrudes towards the inner surface of the bending part 213 so that a hanging part 261, which will be described later, may be hung on the hanging projection 214 on the inner surface of the bending part 213.

A coupling part 260 on which the hanging projection 214 may be hung is provided at the connection part 250 disposed at the other end of the unit cover 200. The coupling part 260 is formed of a plate having a linear shape and the central region of the coupling part 260 is connected to the connection part 250. One end of such a coupling part 260 is disposed close to the post structure 100 and the hanging part 261 is formed on the inner surface of the other end of the coupling part 260 so that the hanging projection 214 may be hung on the hanging part 261.

The hanging part 261, as exemplarily shown in FIG. 2, may include a slope part 262 and a receipt groove 263.

The slope part 262 is formed at the end of the coupling part 260 opposite the end of the coupling part 260 disposed close to the post structure. Such a slope part 262 is sloped such that the slope part 262 is closer to the connection part 250 in a direction from the end to the center of the slope part 262. Although the outer surface of the slope part 262 may be flat, this embodiment describes the slope part 262 as having the outer surface which is convex in the outward direction.

The receipt groove 263 is located under the slope part 262. The receipt groove 263 is opened towards the connection part 250 and, thus, the hanging projection 214 is received in the receipt groove 263. In this embodiment, the receipt groove 263 is disposed between the slope part 262 and the connection part 250.

In the above-described unit cover 200 in accordance with embodiment 1, the post structure 100 has a circular cross-section and, thus, the unit cover 200 has an arc-shaped cross-section. Therefore, when a plurality of unit covers 200 is combined so as to surround the outer surface of the post structure 100, the combined unit covers 200 generally have a circular cross-section, as exemplarily shown in FIG. 3.

Figure 3:
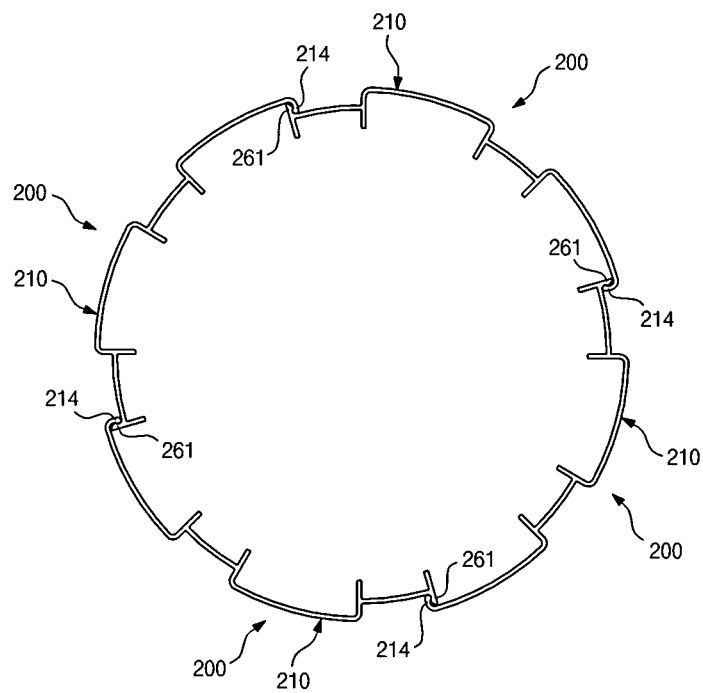
FIG. 3 is a plan view illustrating a state in which unit covers of FIG. 1 are combined.

FIG. 3 illustrates the combined state of the above-described unit covers 200.

As exemplarily shown in FIG. 3, the hanging projection 214 of one unit cover 200 is hung on and combined with the hanging part 261 of an adjacent unit cover 200.

Here, the hanging projection 214 slides along the slope part 262 of the hanging part 261 and is received in the receipt groove 263, thus being combined with the hanging part 261. The hanging part 261 combined with the hanging projection 214 is disposed on the inner surface of the hanging projection 214. That is, the outer surface of the hanging part 261 contacts the inner surface of the bending part 213 provided with the hanging projection 214.

Although FIG. 3 illustrates four unit covers 200 as being combined to have a circular cross-section, the number of unit covers 200 to be combined may be varied according to embodiments, as exemplarily shown in FIG. 4. That is, if one unit cover 200 includes three panel parts 210, as exemplarily shown in FIG. 4, three unit covers 200 may be combined to have a circular cross-section. In such a manner, the number of unit covers 200 combined so as to surround the post structure 100 may be varied according to the number of panels 210 provided on one unit cover 200.

Hereinafter, a process of assembling the above-described pipe cover in accordance with the present invention will be described with reference to FIGS. 5 to 10.

Figure 5:
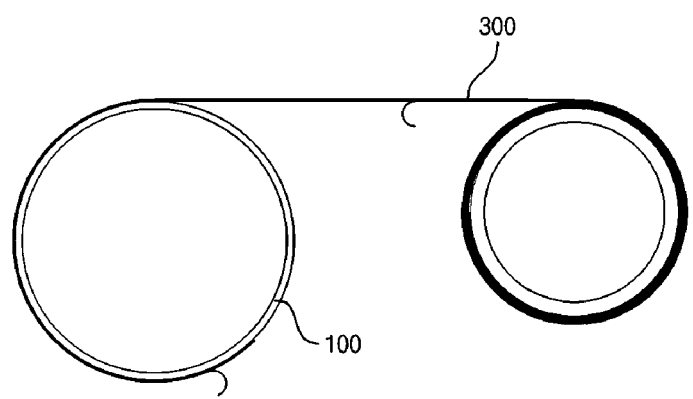
FIGS. 5 to 10 are views illustrating a process of assembling the pipe cover of FIG. 1 in accordance with embodiment 1.

First, an adhesive unit 300 is adhered to the outer surface of the post structure 100, as exemplarily shown in FIG. 5. In this embodiment, the adhesive unit 300 is a double-sided tape having elasticity. After a tape protective film is removed from one surface of the double-sided tape 300, the double-sided tape 300 is adhered to the outer surface of the post structure 100. In this embodiment, the double-sided tape 300 is adhered to three positions of the outer surface of the post structure 100, separated from each other, as exemplarily shown in FIG. 1.

Figure 6:
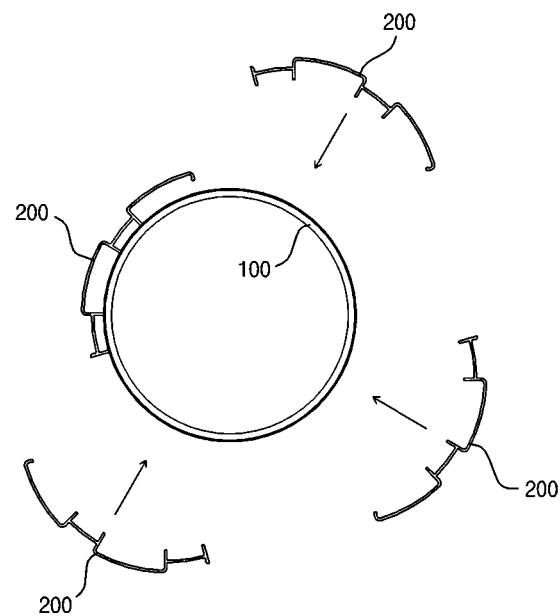

Thereafter, after a tape protective film is removed from the other surface of the double-sided tape 300, one unit cover 200 is adhered to the outer surface of the post structure 100 by the double-sided tape 300, as exemplarily shown in FIG. 6.

Figure 7:
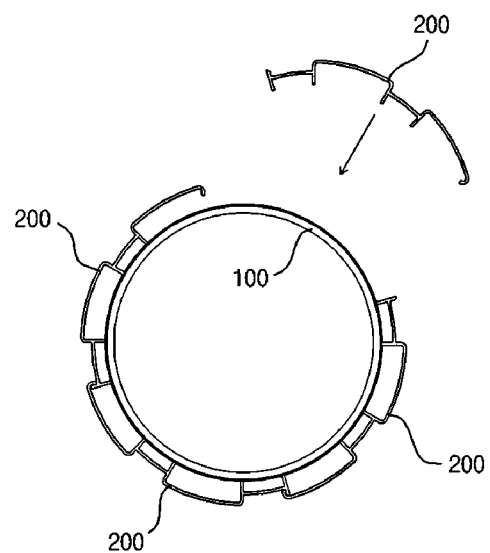

Thereafter, other unit covers 200 are sequentially adhered to the outer surface of the post structure 100, as exemplarily shown in FIG. 7. Here, the hanging projection 214 of one unit cover 200 is hung on the hanging part 261 of an adjacent unit cover 200.

Figure 8:
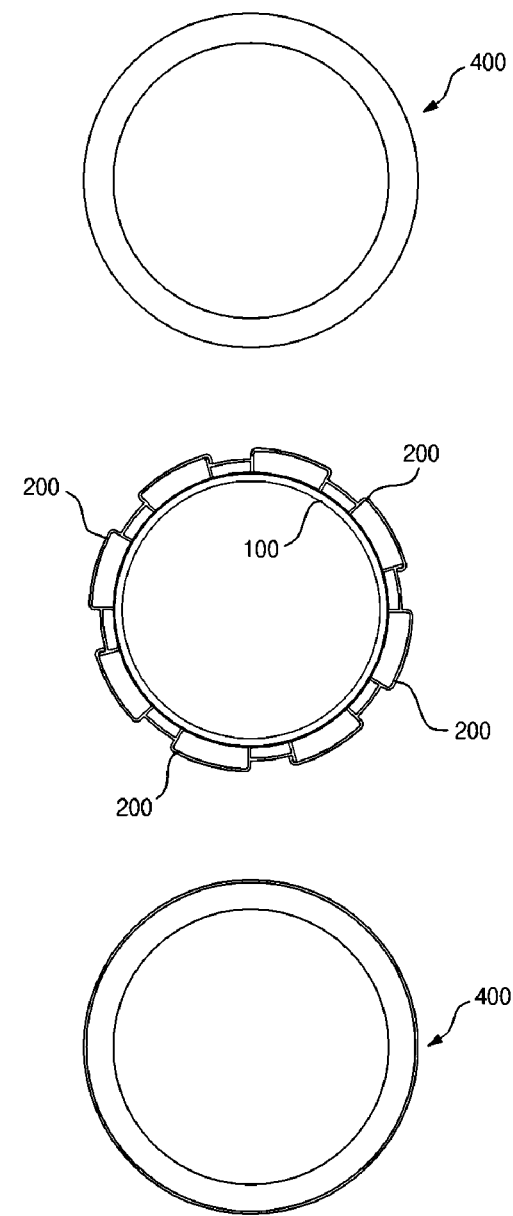
Figure 13:
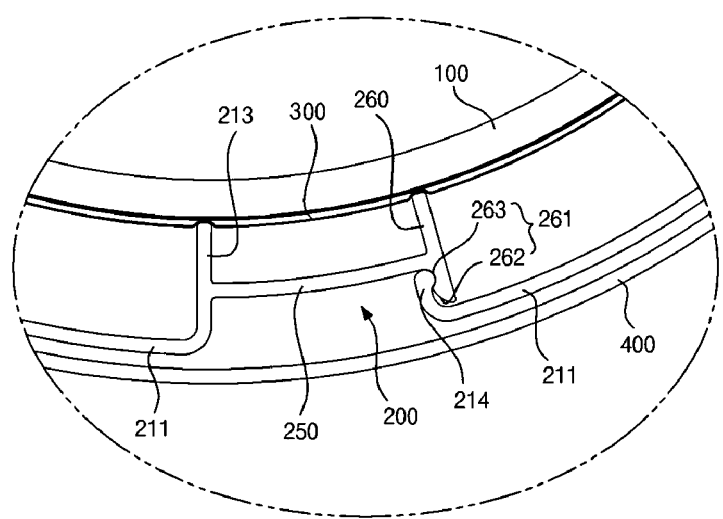
FIG. 13 is an enlarged view of a part of FIG. 12.

When the unit covers 200 are sequentially adhered to the outer surface of the post structure 100 in such a manner, four unit covers 200 are combined with each other while surrounding the outer surface of the post structure 100, as exemplarily shown in FIG. 8. Here, the ends of the bending parts 213 and the coupling parts 260 provided in the respective unit covers 200 contact the adhesive unit 300, as exemplarily shown in FIG. 13, and, when the hanging projections 214 and the hanging parts 261 are pulled and combined with each other, the ends of the bending parts 213 and the coupling parts 260 more strongly press the double-sided tape 300, thus more firmly fixing the unit covers 200.

When the plural unit covers 200 are disposed while surrounding the post structure 100, end caps 400 may be installed at the upper ends or the lower ends of the unit covers 200 surrounding the post structure 100 so as to close spaces between the post structure 100 and the unit covers 200.

The end cap 400, as exemplarily shown in FIG. 1, includes a ring-shaped cap base plate 410 having a pipe insertion part 411, i.e., a circular hole, and a cap side plate 450 disposed vertically along the edge of the cap base plate 410.

Figure 9:
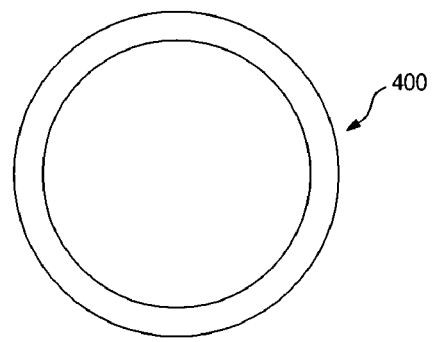
Figure 9:
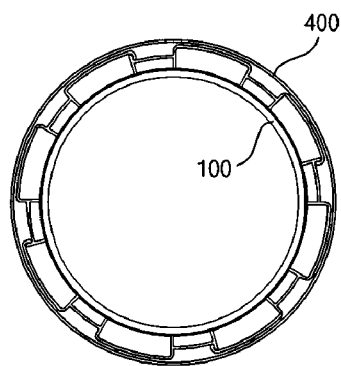
Figure 10:
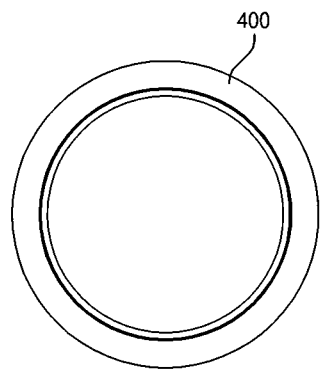

The above-described end caps 400 are installed at the lower ends of the unit covers 200 disposed to surround the post structure 100, as exemplarily shown in FIG. 8, and installed at the upper ends of the unit covers 200 disposed to surround the post structure 100, as exemplarily shown in FIG. 9.

Now, a method for installing the end cap 400 will be described below.

First, since the unit covers 200 are already installed, the pipe insertion part 411 of the end cap 400 is opened by cutting the cap side plate 450 and the cap base plate 410 of the end cap 400, the end cap 400 is installed at the lower ends of the unit covers 200, and then the cutting parts are welded. Otherwise, before the unit covers 200 are installed, the post structure 100 may be inserted into the pipe insertion part 411 of the end cap 400, the unit covers 200 may be installed at the post structure 100, and then the unit covers 200 may be fixed to the end cap 400 such that the end cap 400 into which the post structure 100 is inserted is installed at the lower ends of the unit covers 200.

Figure 11:
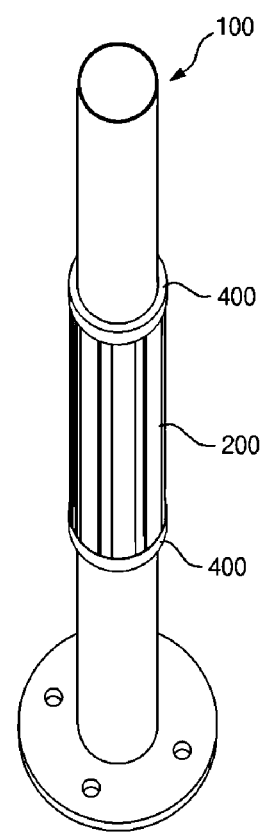
FIG. 11 is a view of the pipe cover of FIG. 1 in an assembled state.
Figure 12:
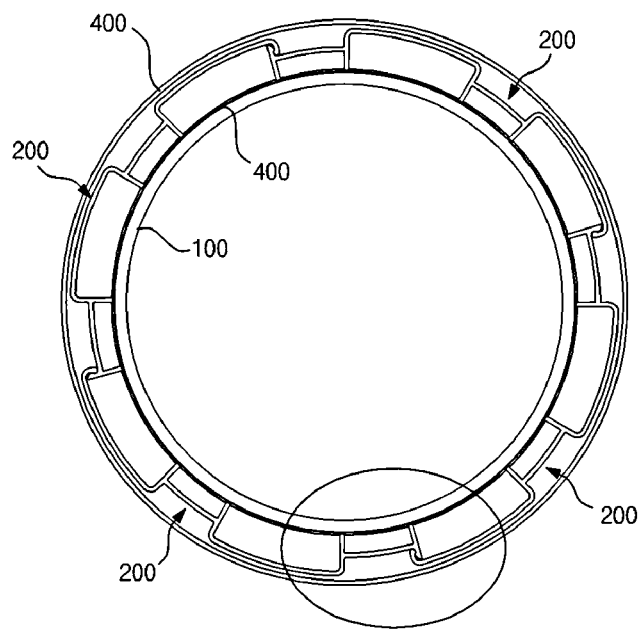
FIG. 12 is a cross-sectional view of FIG. 11.

FIGS. 11 and 12 illustrate a state in which the unit covers 200 and the end caps 400 are installed at the post structure 100.

End Caps in Accordance with Other Embodiments

Figure 14A:
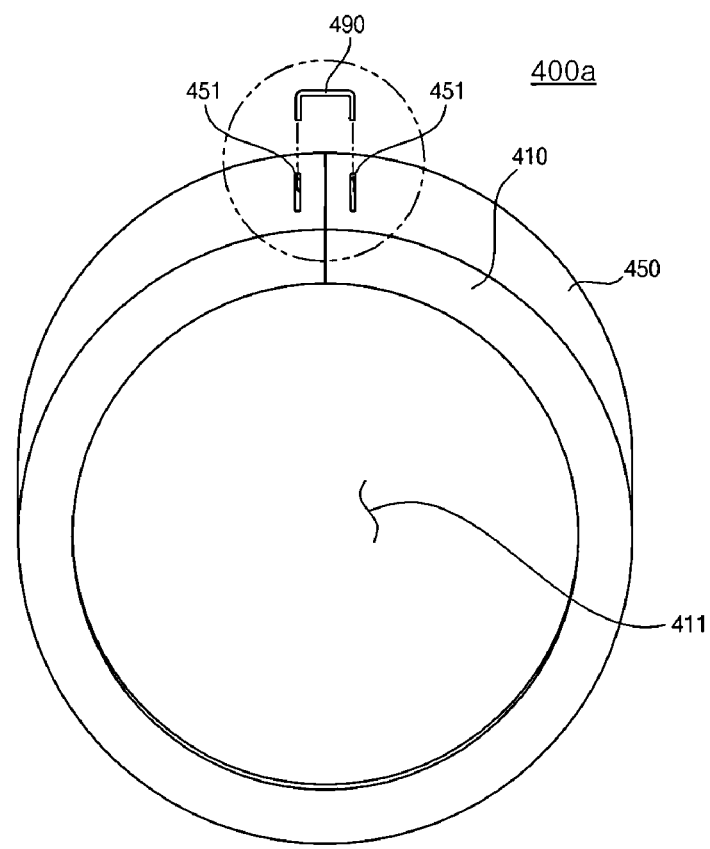
FIGS. 14(a) and 14(b) and FIG. 15 are views illustrating end caps in accordance with other embodiments.
Figure 14B:
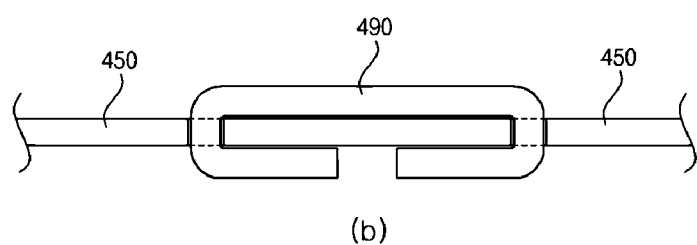
Figure 15:
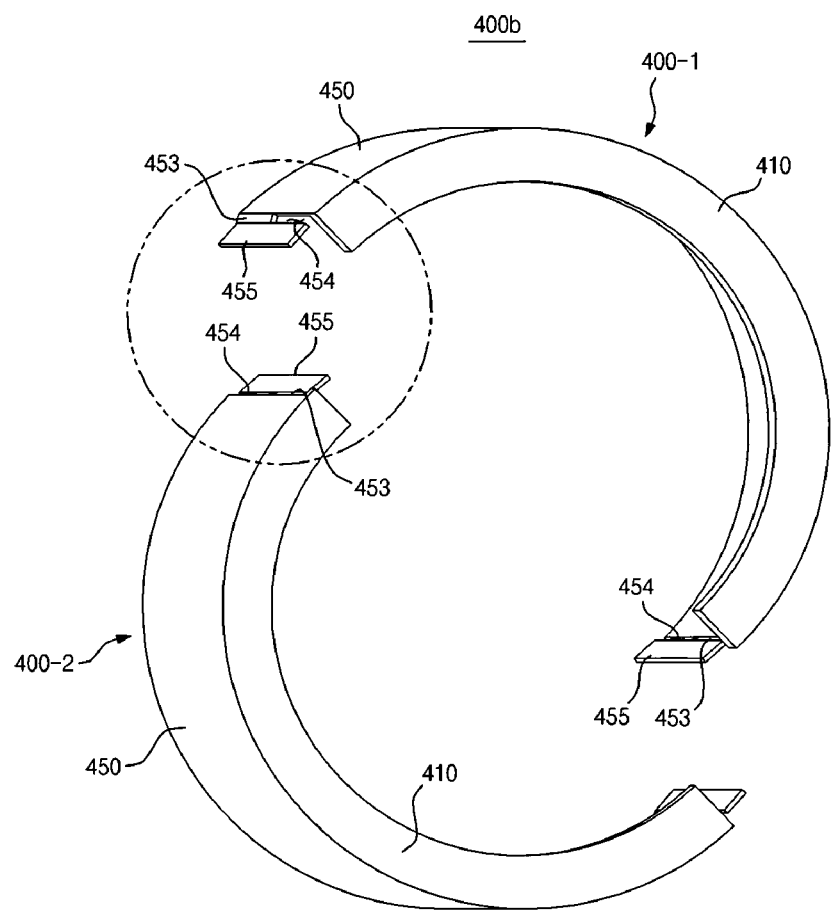

Since cutting of an end cap and then welding of the cutting part of the end cap are inconvenient, in order to solve such inconvenience, FIGS. 14(*a*) and 14(*b*) and FIG. 15 illustrate end caps in accordance with other embodiments.

In an end cap 400*a* in FIG. 14(*a*), a cap side plate 450 and a cap base plate 410 are cut and iron core insertion holes 451 are formed at both ends of the cutting part of the cap side plate 450.

Therefore, the end cap 400*a* is fitted to the outer surface of the post structure 100 through the cutting part of the cap base plate 410.

Thereafter, when a C-shaped iron core 490 is inserted into the iron core insertion holes 451 and both ends of the iron core 490 having passed through the iron core insertion holes 451 are bent and fixed, the end cap 400*a* is installed at the upper ends or the lower ends of the unit covers 200 on the post structure 100.

An end cap 400*b* shown in FIG. 15 is divided into two end cap parts 400-1 and 400-2. Hanging plates 455 are formed at both ends of the respective end cap parts 400-1 and 400-2.

The hanging plate 455 formed at one end of each of the end cap parts 400-1 and 400-2 is connected to the side of the cap side plate 450 opposite the side of the cap side plate 450, on which the cap base plate 410 is disposed, by a connection plate 453, and a cutting part 454 which is opened toward the cap base plate 410 is formed between the hanging plate 455 and the cap side plate 450.

The hanging plate 455 formed at the other end of each of the end cap parts 400-1 and 400-2 is connected to the side of the cap side plate 450, on which the cap base plate 410 is disposed, by a connection plate 453, and a cutting part 454 which is opened toward the side of the cap side plate 450 opposite the side of the cap side plate 450, on which the cap base plate 410 is disposed, is formed between the hanging plate 455 and the cap side plate 450.

Through the above-described configuration, the hanging plate 455 of one end cap part 400-1 and the hanging plate 455 of the other end cap part 400-2 are combined through contact between the respective cutting parts 454.

Therefore, when the end cap parts 400-1 and 400-2 are combined through contact between the cutting parts 454 of the respective end cap parts 400-1 and 400-2 while surrounding the outer surface of the post structure 100, the end cap 400b is installed at the upper ends or the lower ends of the unit covers 200 on the post structure 100.

End Cap in Accordance with Another Embodiment

Figure 16:
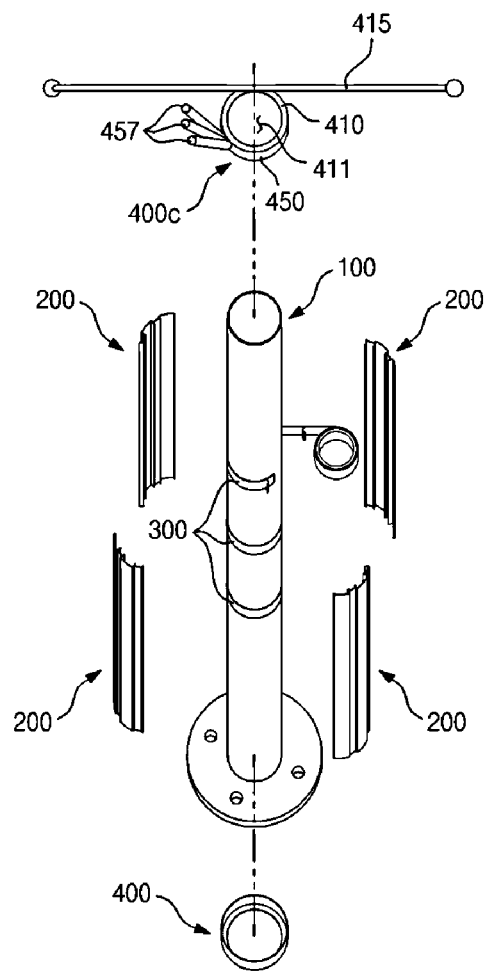
FIG. 16 is a view illustrating an end cap in accordance with another embodiment.
Figure 17:
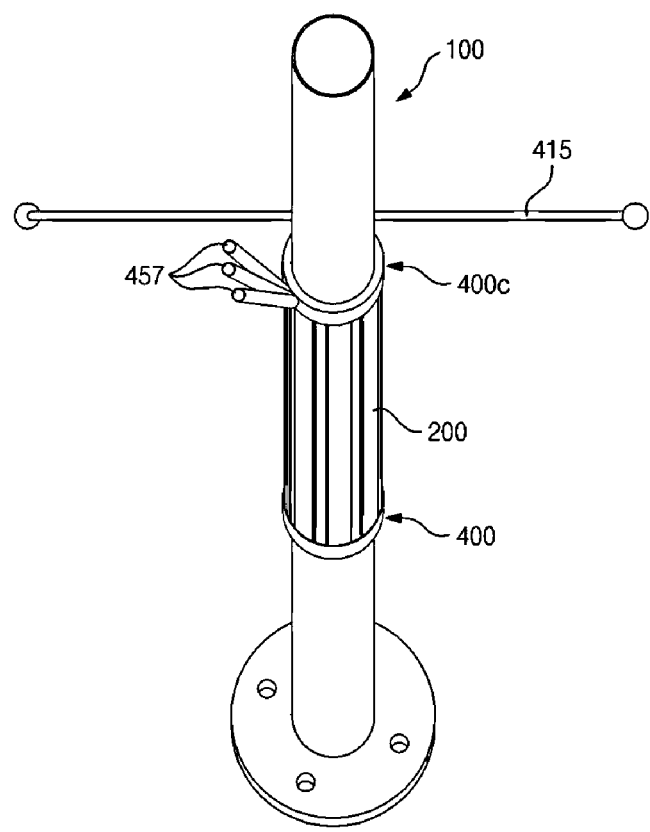
FIG. 17 is a view of the end cap of FIG. 16 in an assembled state.

FIGS. 16 and 17 illustrate an end cap in accordance with another embodiment.

As exemplarily shown in FIG. 16, at least one flagpole 457 is provided on a cap side plate 450 of an end cap 400c installed at the upper ends of the unit covers 200 of the post structure 100 and a placard hanger 415 extended horizontally is provided on a cap base plate 410.

FIG. 17 illustrates a state in which the above-described end cap 400c is installed at the upper ends of the unit covers 200.

Pipe Cover in Accordance with Embodiment 1-1

Figure 18:
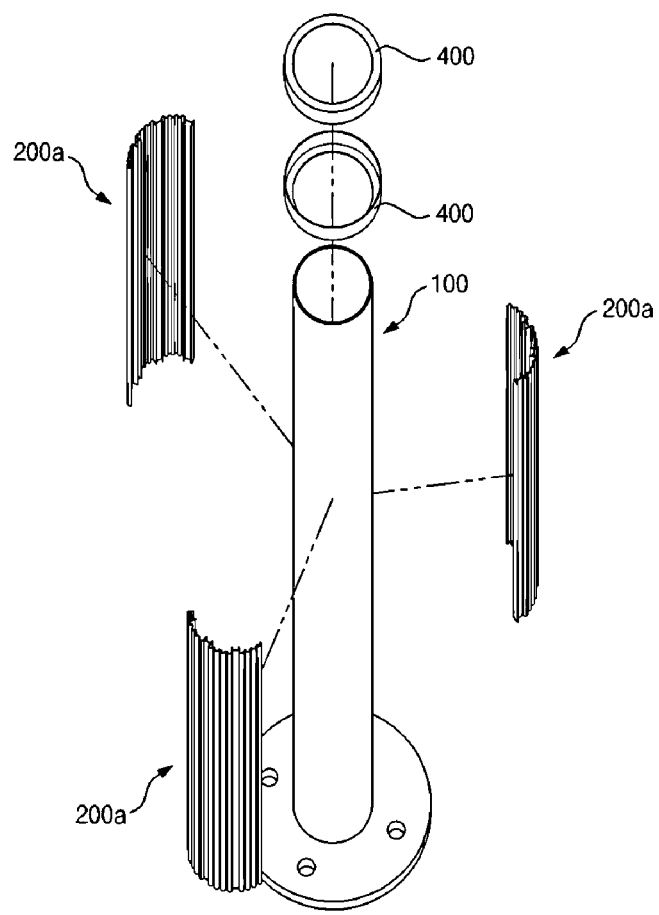
FIG. 18 is an exploded perspective view of a pipe cover in accordance with embodiment 1-1 of the present invention.
Figure 19:
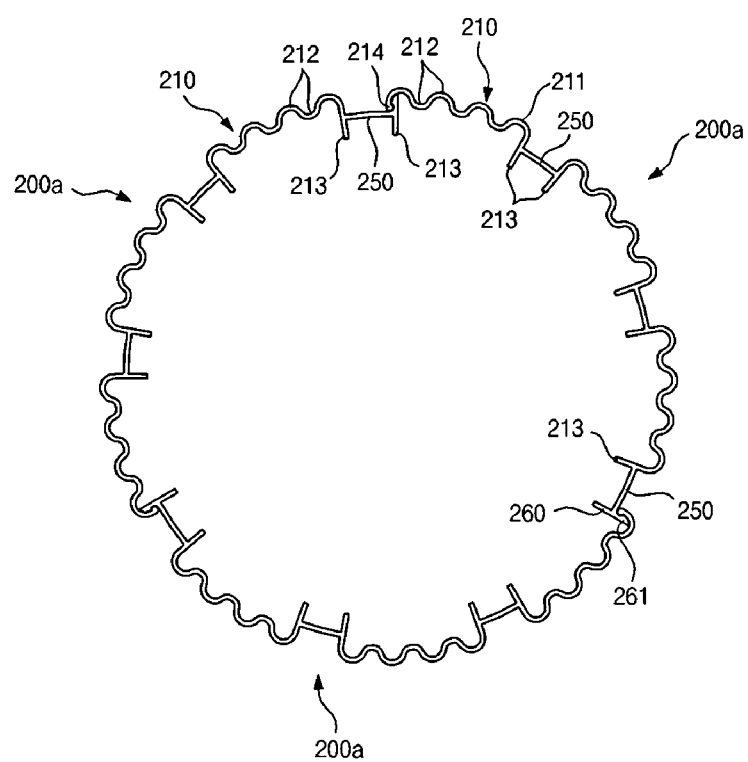
FIG. 19 is a plan view illustrating a state in which unit covers of FIG. 18 are combined.
Figure 20:
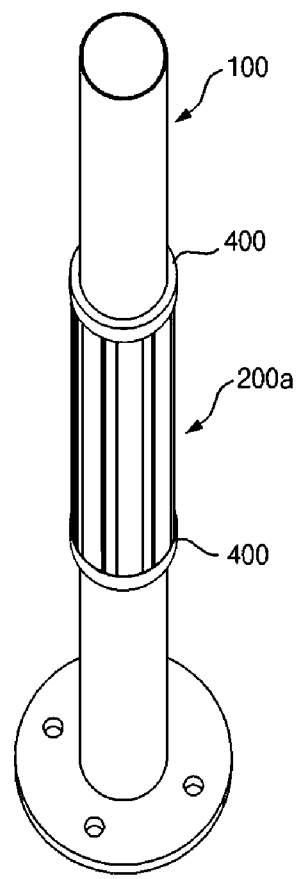
FIG. 20 is a view illustrating the pipe cover of FIG. 18 in an assembled state.

FIGS. 18 to 20 illustrate a pipe cover in accordance with embodiment 1-1.

Some elements of the pipe cover in accordance with Embodiment 1-1, which are substantially the same as those of the pipe cover in accordance with embodiment 1, are denoted by the same reference numerals and a detailed description thereof will be omitted because it is considered to be unnecessary. Therefore, only elements of the pipe cover in accordance with Embodiment 1-1 which differ from those of the pipe cover in accordance with embodiment 1 will be described hereinafter.

The pipe cover in accordance with embodiment 1-1 includes a plurality of unit covers 200a. Each unit cover 200a includes panel parts 210 and connection parts 250.

Prominences and depressions 212 are formed on an outer part 211 of the panel part 210 of each unit cover 200a, as exemplarily shown in FIG. 19. Respective prominences and depressions forming the prominences and depressions 212 have a semicircular cross-section and the semicircular prominences and depressions are gathered to form the curved prominences and depressions 212.

The prominences and depressions 212 formed on the panel parts 210 minimize adhesion parts of attachments adhered to the post structure 100 and reduces an adhesion area, thereby causing a difficulty in adhesion of illegal leaflets and allowing adhered leaflets to be easily removed.

Further, since the unit covers 200a have elasticity in the radial direction due to the prominences and depressions 212, even if the upper and lower parts of the post structure 100 have different diameters, the unit covers 200a may be closely adhered to the post structure 100 due to elasticity of the unit covers 200a.

Pipe Cover in Accordance with Embodiment 2

Figure 21:
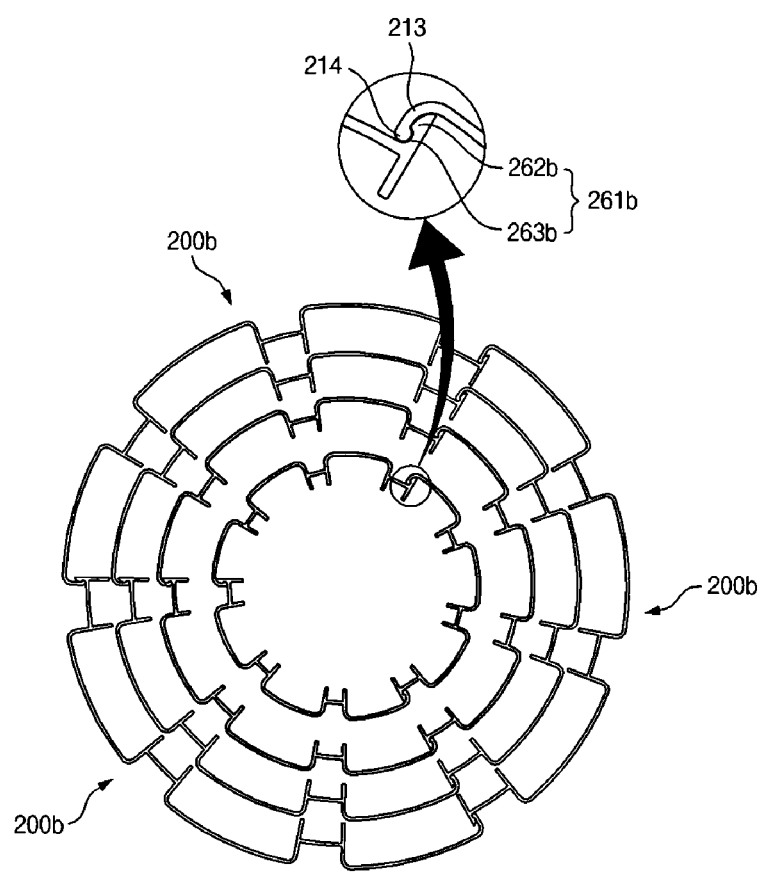
FIG. 21 is a plan view of a pipe cover in accordance with embodiment 2 of the present invention.
Figure 22:
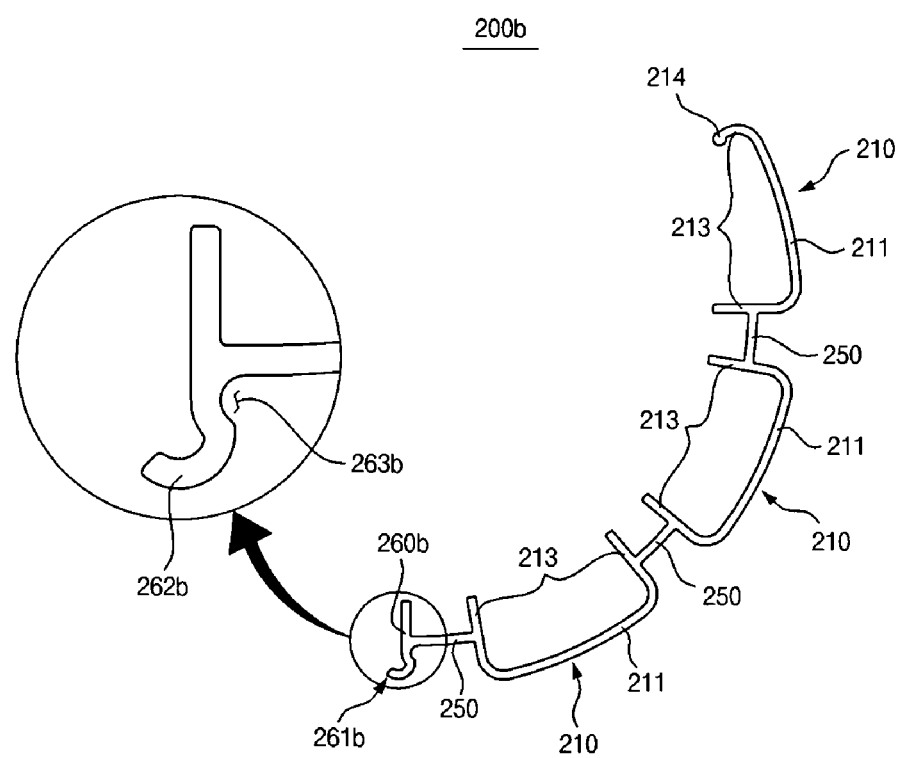
FIG. 22 is a view illustrating a unit cover of FIG. 21.

FIGS. 21 and 22 illustrate a pipe cover in accordance with embodiment 2.

Some elements of the pipe cover in accordance with embodiment 2, which are substantially the same as those of the pipe cover in accordance with embodiment 1, are denoted by the same reference numerals and a detailed description thereof will be omitted because it is considered to be unnecessary. Therefore, only elements of the pipe cover in accordance with embodiment 2 which differ from those of the pipe cover in accordance with embodiment 1 will be described hereinafter.

A post structure 100 in accordance with embodiment 2 has a circular pipe shape.

The pipe cover provided to surround the post structure 100 having a circular pipe shape includes a plurality of unit covers 200b, as exemplarily shown in FIG. 21, and the respective unit covers 200b are combined so as to surround the outer surface of the post structure 100. In this embodiment, since the post structure 100 has a circular pipe shape, the unit covers 200b combined to surround the outer surface of the post structure 100 are disposed along the circumference of the circular pipe shape. Therefore, the respective unit covers 200b have an arc-shaped cross-section. Thus, if the diameter of the post structure 100 increases, as exemplarily shown in FIG. 21, the length of the arc-shaped cross-section of the respective unit covers 200b increases.

Each unit cover 200b, as exemplarily shown in FIG. 22, may include a plurality of panel parts 210 and connection parts 250 connecting the panel parts 210.

In the unit cover 200b including the panel parts 210 and the connection parts 250, the panel part 210 is disposed at one end of the unit cover 200b and the connection part 250 is disposed at the other end of the unit cover 200b.

Among bending parts 213 of the panel part 210 disposed at one end of the unit cover 200b, the bending part 213 disposed at the outer position may have a shorter length than the other bending part 213. A hanging projection 214 is formed at the end of the bending part 213 having a short length provided at the outer position.

A coupling part 260b on which the hanging projection 214 may be hung is provided at the connection part 250 disposed at the other end of the unit cover 200b. The coupling part 260b is formed of a plate having a linear shape and the central region of the coupling part 260b is connected to the connection part 250. One end of such a coupling part 260b is disposed close to the post structure 100 and a hanging part 261b is formed on the inner surface of the other end of the coupling part 260b so that the hanging projection 214 may be hung on the hanging part 261b.

The hanging part 261b, as exemplarily shown in FIG. 21, may include a slope part 262b and a receipt groove 263b.

The hanging part 261b is formed at one end of the coupling part 260b, particularly at the end of the coupling part 260b opposite the end of the coupling part 260b disposed close to the post structure 100. Such a hanging part 261b is bent into an arc shape in a direction opposite the position of the connection part 250 and the outer surface of the hanging part 261b contacts the inner surface of the bending part 213 provided with the hanging protrusion 214, as exemplarily shown in FIG. 21.

The receipt groove 263b is located under the slope part 262b. The receipt groove 263b is opened towards the connection part 250 and, thus, the hanging projection 214 is received in the receipt groove 263b. In this embodiment, the receipt groove 263b is disposed between the slope part 262b and the connection part 250.

FIG. 21 illustrates the combined state of the above-described unit covers 200b.

As exemplarily shown in FIG. 21, the hanging projection 214 of one unit cover 200b is hung on and combined with the hanging part 261b of an adjacent unit cover 200b.

Here, the hanging projection 214 slides along the curved surface of the slope part 262b and is received in the receipt groove 263b, thus being combined with the hanging part 261b. The hanging part 261b combined with the hanging projection 214 is disposed on the inner surface of the hanging projection 214b. That is, the outer surface of the hanging part 261b contacts the inner surface of the bending part 213 provided with the hanging projection 214.

Figure 23:
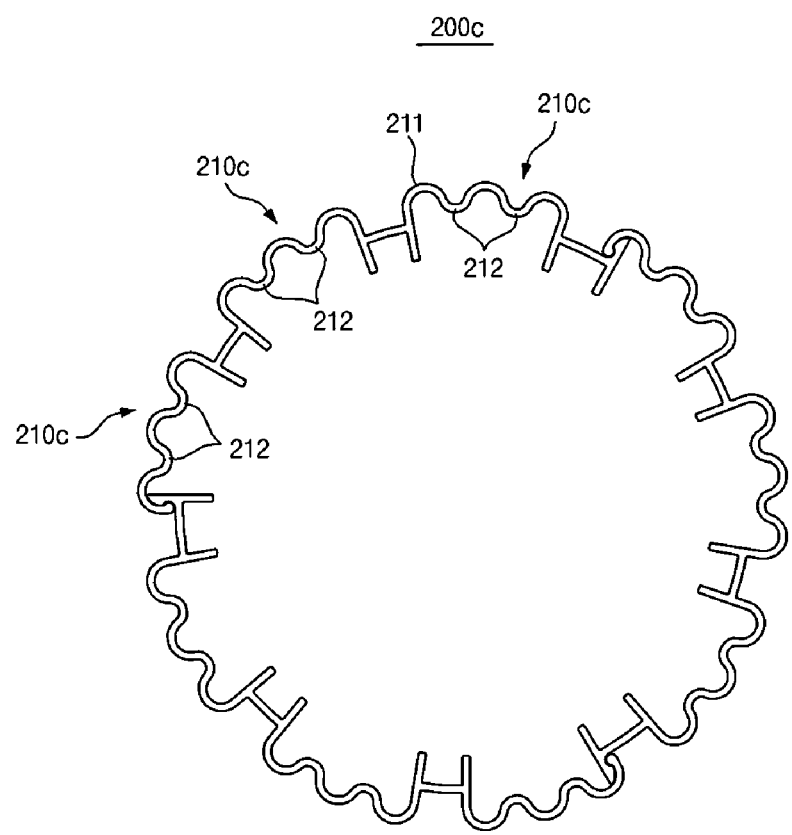
FIG. 23 is a view illustrating unit covers of FIG. 21 on which prominences and depressions are formed.

According to embodiments, prominences and depressions 212 may be formed on an outer surface 211 of a panel part 210c of each unit cover 200c, as exemplarily shown in FIG. 23.

Pipe Cover in Accordance with Embodiment 3

Figure 24:
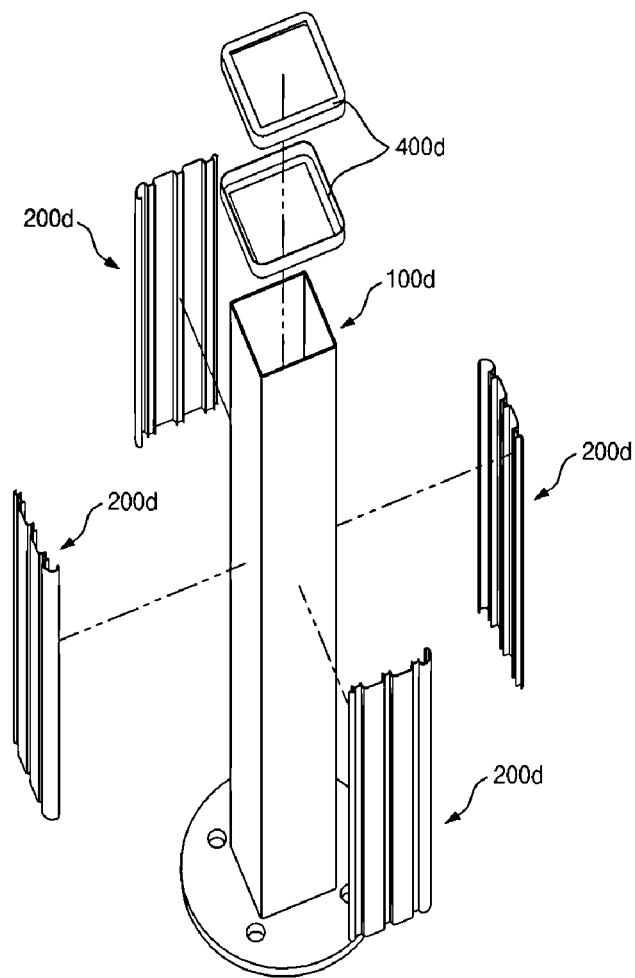
FIG. 24 is an exploded perspective view of a pipe cover in accordance with embodiment 3 of the present invention.
Figure 27:
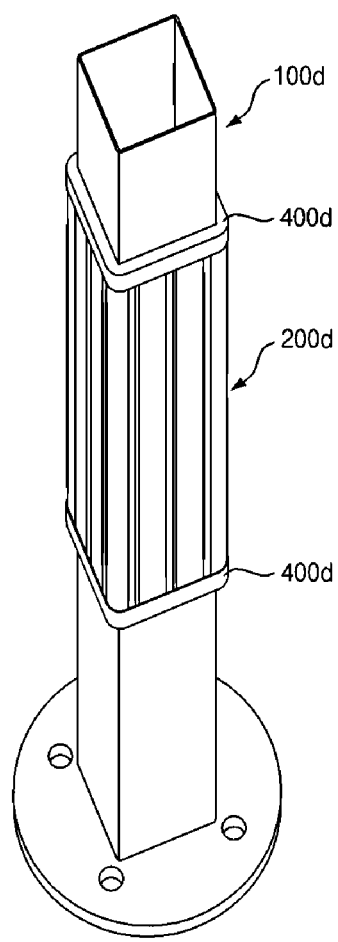
FIG. 27 is a view illustrating the pipe cover of FIG. 24 in an assembled state.

FIGS. 24 and 27 illustrate a pipe cover in accordance with embodiment 3.

Some elements of the pipe cover in accordance with embodiment 3, which are substantially the same as those of the pipe covers in accordance with embodiments 1 and 2, are denoted by the same reference numerals and a detailed description thereof will be omitted because it is considered to be unnecessary. Therefore, only elements of the pipe cover in accordance with embodiment 3 which differ from those of the pipe cover in accordance with embodiment 1 will be described hereinafter.

A post structure 100d in accordance with embodiment 3 has a rectangular pipe shape.

The pipe cover provided to surround the post structure 100d having a rectangular pipe shape includes a plurality of unit covers 200d, as exemplarily shown in FIG. 24, and the respective unit covers 200d are combined so as to surround the outer surface of the post structure 100d. In this embodiment, one unit cover 200d is disposed on each side surface of the post structure 100d and, thus, four unit covers 200d are combined to surround the outer surface of the post structure 100d, as exemplarily shown in FIG. 25.

As the post structure 100d has a rectangular pipe shape, end caps 400d have a rectangular ring shape.

Figure 26:
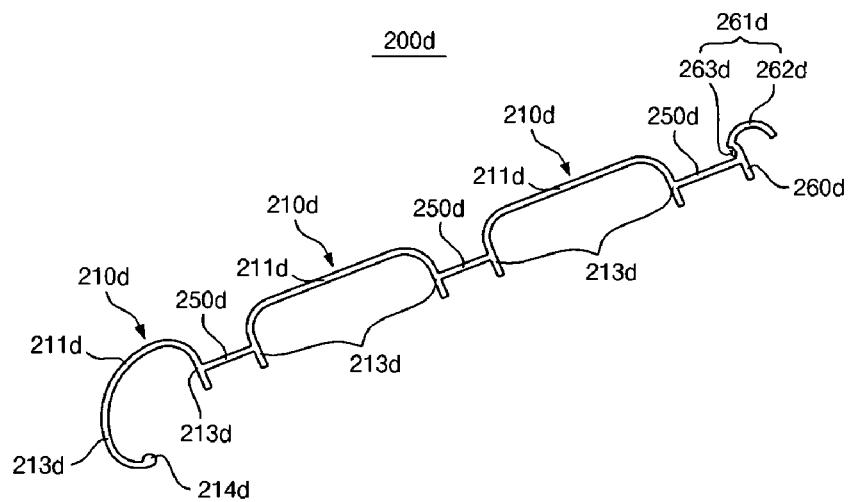
FIG. 26 is a view illustrating a unit cover of FIG. 25.

Each unit cover 200d, as exemplarily shown in FIG. 26, may include a plurality of panel parts 210d and connection parts 250d connecting the panel parts 210d.

In this embodiment, since the post structure 100d has a rectangular pipe shape, outer parts 211d forming the outer surface of the unit cover 200d may have a straight shape and bending parts 213d bending from both ends of the outer parts 211d may bend vertically from the outer parts 211d.

In the unit cover 200d including the panel parts 210d and the connection parts 250d, the panel part 210d is disposed at one end of the unit cover 200d and the connection part 250d is disposed at the other end of the unit cover 200d.

Among the bending parts 213d of the panel part 210d disposed at one end of the unit cover 200d, the bending part 213d disposed at the outer position may bend from the panel part 210d so as to have an arc shape. That is, the panel part 210d and the bending part 213d disposed at the outer position form a gently curved surface. A hanging projection 214d is formed at the end of the bending part 213d disposed at the outer position.

A coupling part 260d on which the hanging projection 214d may be hung is provided at the connection part 250d disposed at the other end of the unit cover 200d. The coupling part 260d is formed of a plate having a linear shape and the central region of the coupling part 260d is connected to the connection part 250d. One end of such a coupling part 260d is disposed close to the post structure 100 and a hanging part 261d is formed on the inner surface of the other end of the coupling part 260d so that the hanging projection 214d may be hung on the hanging part 261d.

The hanging part 261d, as exemplarily shown in FIG. 26, may include a curved part 262d and a receipt groove 263d.

The curved part 262d is formed at one end of the coupling part 260d, particularly at the end of the coupling part 260d opposite the end of the coupling part 260d disposed close to the post structure 100. Such a curved part 262d is bent into an arc shape in a direction opposite the position of the connection part 250d and the outer surface of the curved part 262d contacts the inner surface of the bending part 213d provided with the hanging protrusion 214d, as exemplarily shown in FIG. 25.

The receipt groove 263d is located under the curved part 262d. The receipt groove 263d is opened towards the connection part 250d and, thus, the hanging projection 214d is received in the receipt groove 263d. In this embodiment, the receipt groove 263d is disposed between the curved part 262d and the connection part 250d.

Figure 25:
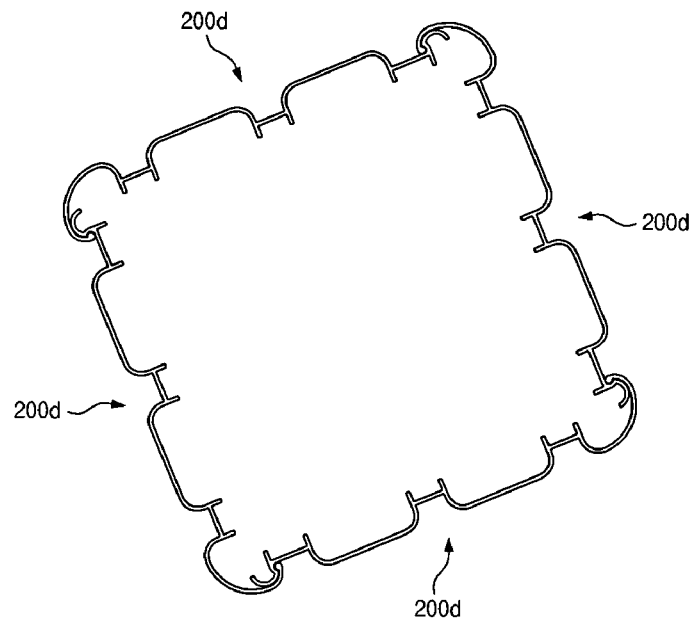
FIG. 25 is a plan view illustrating a state in which unit covers of FIG. 24 are combined.

FIG. 25 illustrates the combined state of the above-described unit covers 200d.

As exemplarily shown in FIG. 25, the hanging projection 214d of one unit cover 200d is hung on and combined with the hanging part 261d of an adjacent unit cover 200d.

Here, the hanging projection 214d slides along the curved surface of the curved part 262d and is received in the receipt groove 263d, thus being combined with the hanging part 261d. The hanging part 261d combined with the hanging projection 214d is disposed on the inner surface of the hanging projection 214d. That is, the outer surface of the curved part 262d contacts the inner surface of the bending part 213d provided with the hanging projection 214d.

FIG. 27 illustrates the state of the pipe cover in which the unit covers 200d and the end caps 400d are assembled.

As apparent from the above description, the cover in accordance with one of the embodiments of the present invention has effects as below.

First, since the hanging projections 214 and the hanging parts 261 of the respective unit covers 200 are pulled and assembled, the unit covers 200 may be rapidly assembled to be adhered to the post structure 100.

Particularly, by assembling the unit covers 200 using elasticity of the unit covers 200, the unit covers 200 may be rapidly and easily combined.

Second, by primarily assembling the hanging part 261 formed on one unit cover 200 with the hanging projection 214 formed integrally with another unit cover 200, separate parts to fix the unit covers 200 to the post structure 100 are not required.

Further, when the double-sided tape 300 having elasticity is adhered to the post structure 100, the unit covers 200 may be secondarily adhered more firmly to the post structure 100 using adhesive force and elasticity of the double-sided tape 300 adhered between the post structure 100 and the unit covers 200. Since the unit covers 200 may be temporarily fixed to designated positions of the post structure 100 using the double-sided tape 300, assembly may be rapidly and easily carried out and the unit covers 200 may be more firmly fixed without movement of the unit covers 200 or generation of noise due to movement of the unit covers 200.

Further, by thirdly assembling the end caps 400 with the upper and lower ends of the unit covers 200 combined to surround the post structure 100, the unit covers 200 may be more firmly adhered to the post structure 100. In such a manner, the end caps 400 may fix the upper and lower ends of the unit covers 200 and simultaneously close spaces between the unit covers 200 and the post structure 100, thereby improving the external appearance of the pipe cover.

Third, the unit covers 200 are assembled along the circumference of the post structure 100 and thus welding or separate fastening units may not be required, and perforation of the post structure 100 is not required and thus assembly efficiency may be improved.

Fourth, the unit covers 200 having the same shape may be mass-produced through injection molding using aluminum or a synthetic resin and manufacturing costs may be reduced.

Fifth, the placard hanger 415 to hang advertisement placards and the flagpole 457 to raise a flag may be integrally installed on the pipe cover and thus appearance of the city may be improved.

Sixth, the prominences and depressions 212 are formed on the panel parts 210, minimize adhesion parts of attachments adhered to the post structure 100, and reduces an adhesion area, thereby causing a difficulty in adhesion of illegal leaflets and allowing adhered leaflets to be easily removed.

Further, since the unit covers 200a have elasticity in the radial direction due to the prominences and depressions 212, even if the upper and lower parts of the post structure 100 have different diameters, the unit covers 200a may be closely adhered to the post structure 100 due to elasticity of the unit covers 200a.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pipe cover comprising:
    a plurality of unit covers surrounding a pipe or post structure, wherein each unit cover includes panel parts and connection parts,
    each of the panel parts including
        an outer part forming an outer surface of the panel parts and having a curved shape, and
        bending parts obliquely bending from both ends of the outer part toward the pipe or post structure, the bending parts having a first bending part disposed at a first end of the outer part and a second bending part disposed at a second end of the outer part, wherein each of the first and second bending parts forms an acute angle with an inner surface of the outer part, and
    each of the connection parts having an arc shape and connecting adjacent two panel parts, wherein a first end of said each of the connection parts is connected to a middle portion of the first bending part of one of the adjacent two panel parts, and a second end of said each of the connection parts is connected to the second bending part of the other one of the adjacent two panel parts when two or more panel parts are connected in series, and
    wherein the second bending part of a first panel part disposed at a first end of said each unit cover has a shorter length than that of the first bending part of the first panel part, and includes a hanging projection protruding from a side of the second bending part facing the first bending part of the first panel part, and
    wherein a terminal connection part disposed at a second end of said each unit cover includes a coupling part having a board shape, and a middle portion of the coupling part is connected to the second end of the terminal connection part, the coupling part having a hanging part for engaging with the hanging projection of the first panel part.

2. The pipe cover according to claim 1, wherein the hanging part includes:
    a slope part formed at the end of the coupling part and sloped so as to be closer to the terminal connection part in a direction from the end to the center thereof; and
    a receipt groove located under the slope part so that the hanging projection is received in the receipt groove,
    wherein the hanging projection slides along the slope part and is received in the receipt groove.

3. The pipe cover according to claim 2, wherein an end cap is installed at the upper ends or lower ends of the unit covers so as to close spaces between the pipe or post structure and the unit covers, when the unit covers are disposed so as to surround the pipe or post structure.

4. The pipe cover according to claim 1, wherein the hanging part includes:
    a curved part formed at one end of the coupling part and bent in a direction opposite the position of the terminal connection part so as to contact a surface of the handing projection; and
    a receipt groove located under the curved part so that the hanging projection is received in the receipt groove,
    wherein the hanging projection slides along the curved surface of the curved part and is received in the receipt groove.

5. The pipe cover according to claim 4, wherein an end cap is installed at the upper ends or lower ends of the unit covers so as to close spaces between the pipe or post structure and the unit covers, when the unit covers are disposed so as to surround the pipe or post structure.

6. The pipe cover according to claim 1, wherein the outer part of the panel part has prominences and depressions.

* * * * *